(12) United States Patent
Nebel

(10) Patent No.: US 6,930,244 B1
(45) Date of Patent: Aug. 16, 2005

(54) FLEXIBLE WIRING AND TUBING CARRIER FOR SLIDE-OUT ROOMS

(76) Inventor: Michael W. Nebel, Rte. 3, Box 6-A, Smith Center, KS (US) 66967

(*) Notice: Subject to any disclaimer, the term of this patent is extended or adjusted under 35 U.S.C. 154(b) by 0 days.

(21) Appl. No.: 10/602,277

(22) Filed: Jun. 24, 2003

(51) Int. Cl.$^7$ .............................................. H02G 13/00
(52) U.S. Cl. ..................... 174/48; 174/70 R; 174/71 R; 174/72 R; 174/72 C; 174/72 TR; 248/68.1; 248/73; 248/62; 248/65; 248/74.3; 248/477; 248/220.2
(58) Field of Search ................................ 174/48, 70 R, 174/71 R, 72 R, 72 C, 72 TR; 248/68.1, 248/73, 62, 65, 74.3, 477, 220.2

(56) References Cited

U.S. PATENT DOCUMENTS

| | | | |
|---|---|---|---|
| 3,161,205 A | | 12/1964 | Merker |
| 3,551,612 A | | 12/1970 | Guentner |
| 3,676,572 A | | 7/1972 | Davies |
| 3,710,199 A | * | 1/1973 | Cignoni, Jr. ................ 361/827 |
| 4,114,043 A | | 9/1978 | Gransfried |
| 4,614,383 A | | 9/1986 | Polley et al. |
| 5,169,100 A | * | 12/1992 | Milcent et al. ............ 248/68.1 |
| 5,746,389 A | * | 5/1998 | Willmann ................ 242/615.1 |
| 5,951,082 A | | 9/1999 | DiBiagio et al. |
| 6,215,068 B1 | * | 4/2001 | Meier ........................ 174/68.1 |
| 6,326,547 B1 | * | 12/2001 | Saxby et al. .................. 174/69 |
| 6,501,020 B2 | | 12/2002 | Grant et al. |
| 2002/0092662 A1 | | 7/2002 | Grant et al. |

OTHER PUBLICATIONS

Web pages for KENCOVE Farm Fence, Inc. on sale prior to invention by inventor (12 pgs).

* cited by examiner

Primary Examiner—Dean A. Reichard
Assistant Examiner—Anton Harris
(74) Attorney, Agent, or Firm—Darby & Darby

(57) ABSTRACT

A line carrier for supporting wiring and tubing extending between a vehicle and a slide-out room of the vehicle comprises an elongated strip of a flexible and material having a first end secured to a skirt of the slide-out room which extends below the vehicle floor and a second end which is pivotally mounted on a pivot pin extending below the vehicle floor. A plurality of retainers with line receiving holes formed therein are secured to the elongated strip. Wires or tubing are threaded through the line receiving holes in the retainers to connect or secure the wires and tubing to the elongated strip. When the slide-out room is retracted, the elongated strip forms a coil on which the wires and tubing are supported. As the slide-out room-advances to an extended position, the elongated strip uncoils and the second end pivots about the pivot pin.

21 Claims, 5 Drawing Sheets

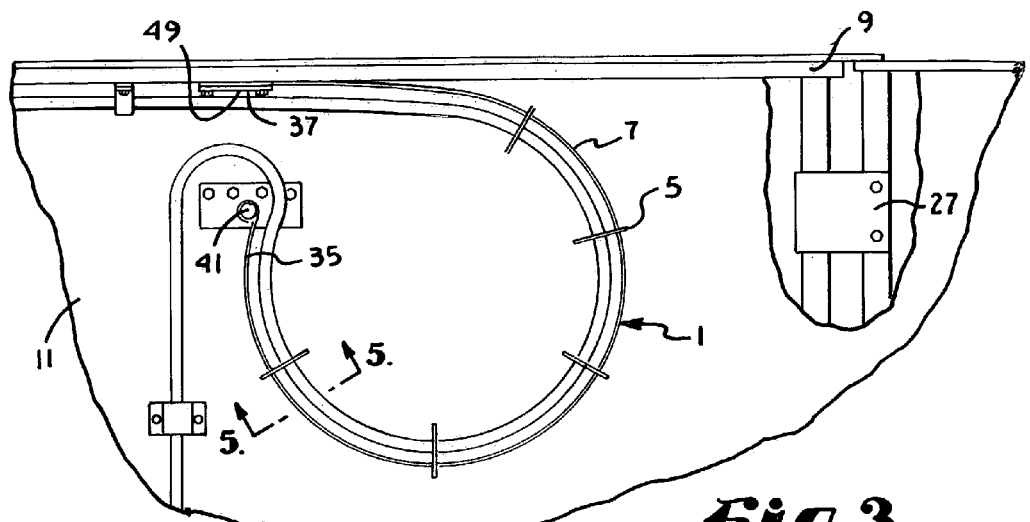
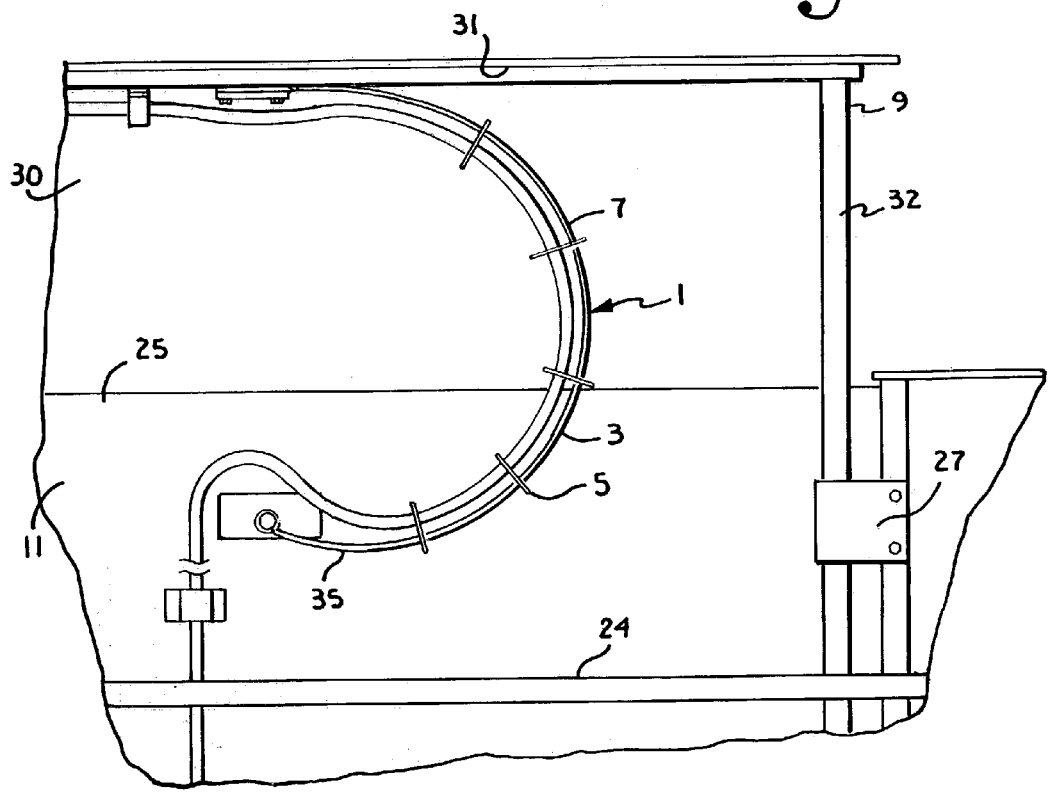
Fig.3.
Fig.4.

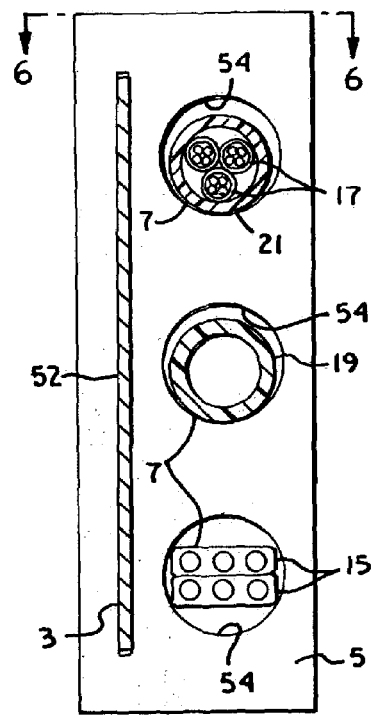
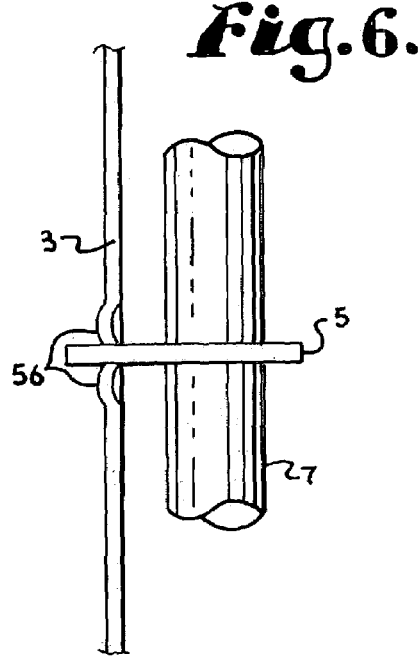
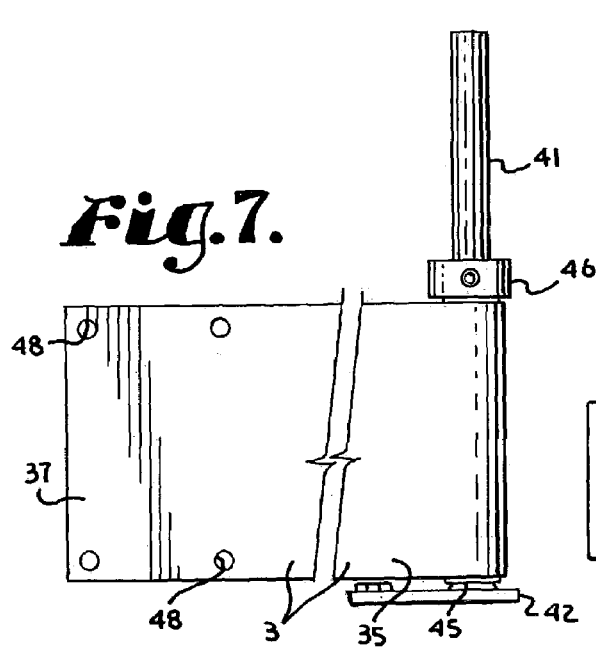
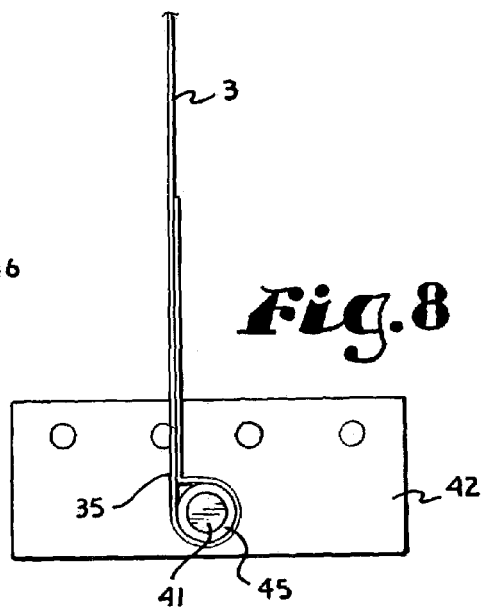

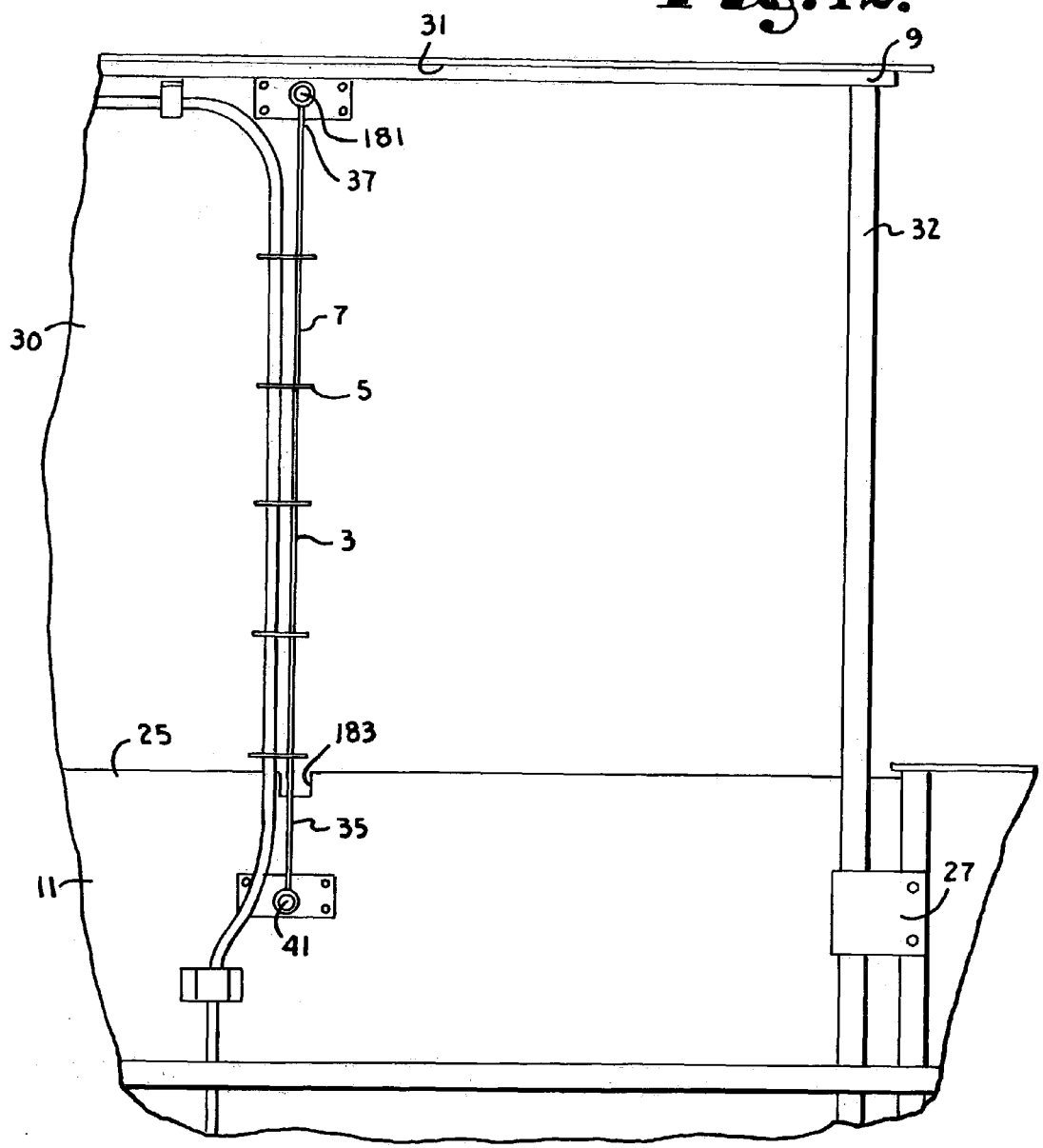

FLEXIBLE WIRING AND TUBING CARRIER FOR SLIDE-OUT ROOMS

BACKGROUND OF THE INVENTION

1. Field of the Invention

The present invention comprises a wiring and tubing carrier for supporting line members such as wiring and/or tubing extending between a fixed structure and a movable structure, such as a slide-out room of a recreational vehicle.

2. Description of the Related Art

Recreational vehicles (RV's) often include a slide-out room which is movable between extended and retracted positions. The slide-out room remains retracted during transit of the vehicle and is extended when the vehicle is parked, to increase the usable floor space within the vehicle. Movement of the slide-out room is usually accomplished by an electric-motor acting through a gear drive, chain drive, or the like.

If the slide-out room includes electrically operated outlets or equipment, a gas stove or heater, or plumbing fixtures, some means must be provided for the orderly management of the wiring and/or tubing for such features during extension and retraction of the slide-out room. The wiring may include conductors for both low voltage (12V DC) and high voltage (110V AC). Plumbing may include water supply lines, as well as drain lines. Such lines must all be flexible. Additionally, such a wiring and tubing carrier must allow the wiring and/or tubing to flex as the slide-out room is extended and retracted, but must protect the lines from being pinched, stretched, or otherwise damaged.

In the past, wiring and tubing carriers for recreational vehicles have comprised a folding arm having two rigid sections of steel channel connected by a hinge joint. One end of the arm is hingedly connected to the main frame of the RV, and the opposite end of the arm is hingedly connected to the underside of the slide-out room so that the arm moves within a generally horizontal plane below the slide-out room. As the slide-out room is extended and retracted, the arm bends at the hinge joint. The channel is positioned with the flanges oriented inwardly toward the inside of the bend. The wiring and/or tubing is fastened to the arm sections, either inside the channel or on the back side of the channel, outside of the bend.

A problem with the folding arm type wiring and tubing carrier is that the hinge joint folds to a relatively sharp angle as the slide-out room is retracted, which can cause the wiring or tubing on the outside of the bend to be damaged by stretching. Wiring or tubing inside of the bend can be damaged by pinching. Gas lines are particularly susceptible to damage because they cannot be safely bent to less than a specific radius (such as 6 inches) depending on the hose configuration.

Wiring carriers having flexible support members are well known in applications other than slide-out rooms of recreational vehicles and trailers. For example, U.S. Pat. No. 6,501,020 to Grant et al. and U.S. Pat. No. 3,551,612 to Guentner both disclose a flexible wiring carrier for routing at least one cable from a first portion of an electrical equipment support system to a second portion of the system, wherein the first portion is movable relative to the second portion. The wiring carriers each comprise a flexible support strip extending curvilinearly between the first and second portions of the electrical equipment support system, wherein the flexible support member moves in conjunction with the movement of the first portion of the system. In both cases, the flexible support member remains connected between the first and second portions of the electrical equipment support system while the first portion moves.

The flexible support member of each patent has an upper edge extending continuously from the first portion of the equipment support system to the second portion. In both cases, substantially all of the upper edge remains disposed in a single horizontal plane while the flexible support member moves in conjunction with movement of the first portion. Both patents (U.S. Pat. Nos. 6,501,020 and 3,551,612) teach that the wiring carrier has at least one retention feature or retainer fixedly disposed along the flexible support member for supporting at least one cable. Both patents teach the flexible support member as being a generally uniformly flexible strip or belt which is disposed generally beneath the first portion of the support system.

In each of the devices disclosed by the Grant and Guentner patents, a first end of the flexible support member is rigidly connected to the first portion of the support system such that a respective first leg of the flexible support member remains, or is constrained to remain, oriented generally parallel to the direction of movement of the first portion, throughout the range of movement of the first portion. Similarly, a second end of the flexible support member is rigidly connected to the second portion of the support system, such that a respective second leg of the flexible support member remains, or is constrained to remain, oriented generally parallel to the direction of movement of the first portion throughout the range of movement of the first portion.

A problem that occurs with flexible support strips for wires and tubes, when both ends of the carrier strip are fixed in place, is that the strip may be stressed excessively unless the range of motion is limited for a given length of strip or the length of the strip must be increased for a given length of motion than might otherwise be necessary. Another problem with flexible strip type cable and tube supports is the volume of space which is occupied by the mechanism or which must be dedicated to clear the support-strip and supported wires and tubes from the retracted position through the extended position.

SUMMARY OF THE INVENTION

The present invention comprises a wiring and tubing carrier for a slide-out room of a trailer, recreational vehicle, or the like. The carrier includes a flexible support member or carrier strip which extends arcuately between the main body of the vehicle and an outer skirt of the slide-out room. A first end of the carrier strip is pivotally connected to the main body of the vehicle, and an opposite second end of the carrier strip is fixedly connected to the outer skirt of the slide-out room, such that a leg of the carrier strip extending immediately from the fixed end of the strip is oriented generally perpendicularly to the direction of movement of the slide-out room. A plurality of retainer members or plates are spaced along the carrier strip and are adapted for supporting or securing a combination of line members, such as electrical wires or flexible fluid-carrying tubes, which are extended through holes in the retainer plates to retain the line members in close proximity to the carrier strip as the slide-out room is extended and retracted relative to the vehicle.

The carrier strip is an elongated flat strip of a flexible and resilient material. A pivot sleeve is attached at the pivoted or inner end of the carrier strip and is received over a pivot pin or spindle mounted on the bottom side of a floor member of the trailer vehicle. A collar is secured to the pivot pin to enable the sleeve to pivot freely on the pivot pin. The fixed or outer end of the carrier strip is secured to a component of the slide-out room, such to an outer skirt, as by the use of a mounting plate and threaded fasteners, such as screws or bolts.

The ends of the carrier strip are mounted in a generally aligned relation, and remain in such alignment during translation of the slide-out room. The carrier strip extends arcuately or in a curved shape between the pivoted end and the fixed end. Movement of the slide-out room to the extended position draws the carrier strip out to an extended configuration in which the carrier strip, although still arcuate, has curves of larger radii. It is foreseen however, that the carrier strip could be pulled relatively taught and straight when the room is advanced to the extended position. As the room is retracted, the pivotal connection of the inner end to the trailer floor, the fixed connection of the outer end to the slide-out room, and the resilience of the carrier strip cooperate to allow the carrier strip to assume a somewhat spiral shape relative to the pivot pin, thus minimizing the space occupied by the carrier mechanism.

Line members such, such as electrical cables and flexible fluid carrying tubes, are retained along the carrier strip by a plurality of retainer plates spaced along the carrier strip. Each retainer plate is a flat rectangular member with a slot formed therethrough and a plurality of apertures for the wires and/or tubes sized to enable such wires or tubes to pass loosely therethrough. The slot or slit is sized to receive the carrier strip to enable the retainer plates to be spaced along the carrier strip. The retainer plates may be held in place along the carrier strip by forming small crimps in the edges of the carrier strip on opposite sides of each retainer plate, once the plate is placed in a desired position along the carrier strip.

The carrier strip can be formed from a wide variety of flexible and generally resilient material such as galvanized steel, spring steel or a fiber reinforced polymer. The retainer plates are formed separately of a material such as a hard rubber, a polymer, or the like. It is also foreseen that the line retainer members or features could be formed integrally with the carrier strip. The line retainer features could be provided as holes or apertures formed through the strip or as members stamped out of the strip. A carrier strip formed from a polymer or composite could be formed by a molding process and could include integrally molded line retainers.

The various features of the flexible line carrier apparatus of the present invention provides a mechanism for handling wires and flexible tubes extending between relatively movable structures, such as a trailer or recreational vehicle and a slide-out room, which is compact in both retracted and extended configurations and which, in some cases, minimizes flexure of such wires or tubes. The carrier mechanism of the present invention is also relatively simple in construction and installation.

Various additional objects and advantages of this invention will become apparent from the following description taken in relation to the accompanying drawings wherein are set forth, by way of illustration and example, certain embodiments of this invention.

The drawings constitute a part of this specification, include exemplary embodiments of the present invention, and illustrate various objects and features thereof.

BRIEF DESCRIPTION OF THE DRAWINGS

FIG. 3 is a fragmentary bottom plan view of the flexible wiring and tubing carrier mechanism at a reduced scale, with the carrier mechanism and the slide-out room shown in retracted configurations.

FIG. 4 is a view similar to FIG. 3 with the carrier mechanism and the slide-out room shown in a partially extended configuration.

FIG. 5 is an enlarged cross sectional view taken on line 5—5 of FIG. 3 and illustrates details of a retainer plate of the carrier mechanism.

FIG. 6 is an enlarged fragmentary bottom plan view taken on line 6—6 of FIG. 5 and illustrates further details of a retainer plate of the carrier mechanism.

FIG. 7 is an enlarged fragmentary side elevational view showing details of a carrier strip and pivot pin of the carrier mechanism, shown in an inverted orientation.

FIG. 8 is an enlarged fragmentary bottom plan view showing further details of the carrier strip and pivot pin of the flexible wiring and tubing carrier mechanism of the present invention.

FIG. 12 is a fragmentary bottom plan view of the flexible wiring and tubing carrier mechanism similar to that shown in FIG. 3 but pivotal at both ends and shown in a fully extended configuration.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 2:
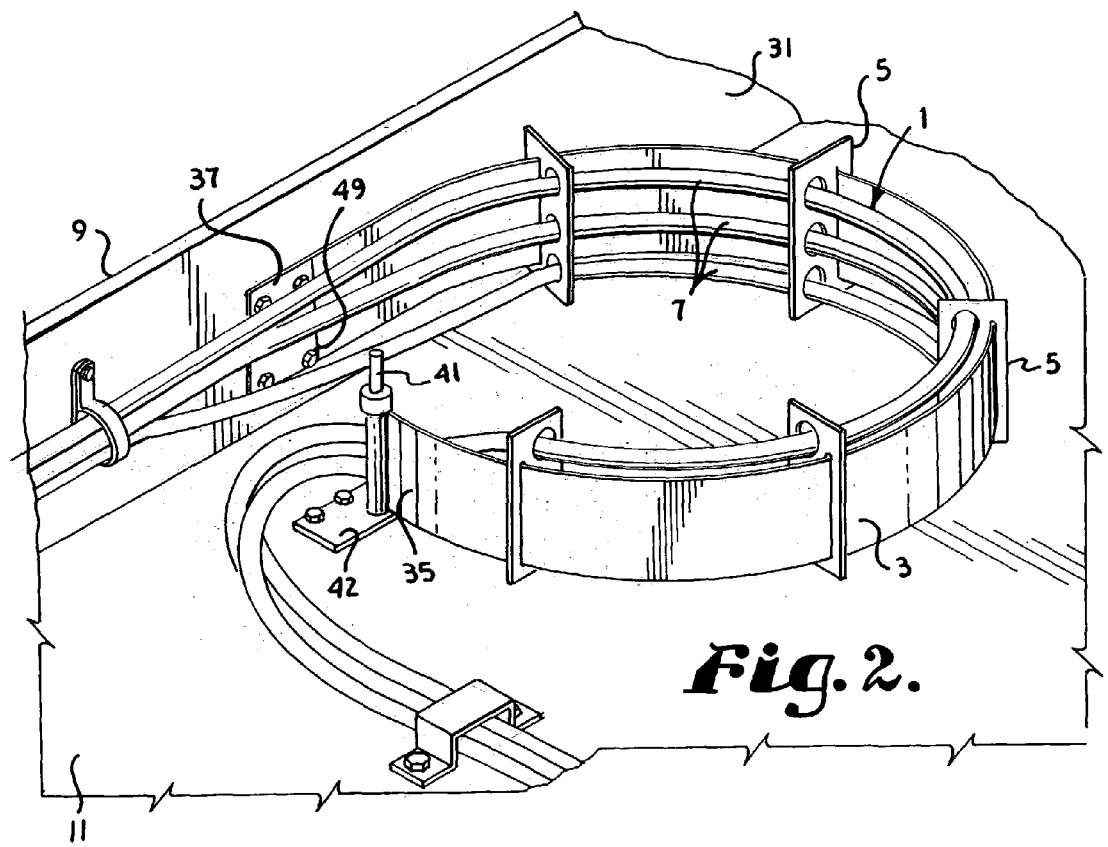
FIG. 2 is an enlarged fragmentary view of the flexible wiring and tubing carrier mechanism with wiring and tubing members connected thereto, shown in an inverted orientation for clarity.
Figure 1:
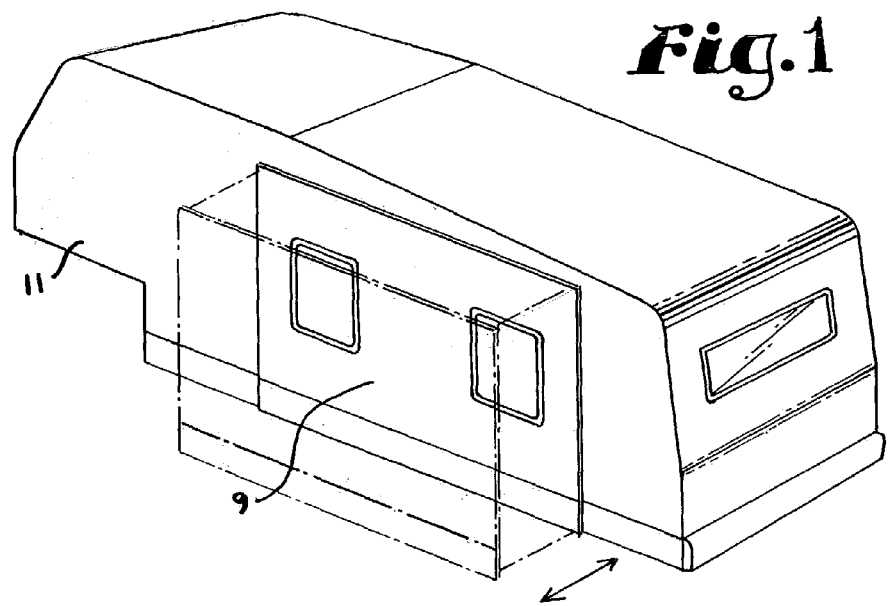
FIG. 1 is a perspective view of a trailer structure within which is installed a flexible wiring and tubing carrier mechanism for slide-out rooms which embodies the present invention, with an extended position of a slide-out room shown in phantom lines.

Referring to the drawings in more detail, the reference numeral 1 generally designates a flexible wiring and tubing carrier assembly or mechanism which embodies the present invention. The carrier mechanism 1 includes a flexible and resilient support member or carrier strip 3 with a plurality of retainer members 5 positioned in spaced relation along the carrier strip 3. The retainer members 5 are used to attach a plurality of line members 7 such as electrical cables or flexible fluid carrying tubes, to the carrier strip 3 and thereby manage such line members 7 which extend between a relatively movable structure 9, such as a slide-out room, and a relatively stationary structure 11, such as a trailer, recreational vehicle (RV) or the like. Referring to FIG. 1, the slide-out room 9 may be advanced from a retracted position to an extended position (as shown in phantom lines) relative to the trailer 11 to increase the enclosed space of the trailer 11 that may be utilized. The slide-out room 9 may then be advanced back to the retracted position to facilitate transportation. The slide-out room 9 slides or moves relative to the trailer or vehicle 11 and therefore the slide-out room 9 may be referred to as the relatively movable structure and the vehicle or trailer 11 may be referred to as the relatively stationary structure.

The room 9 may have electrical wiring, gas lines and/or plumbing which communicate with systems or utility sources within the vehicle 11. The line members 7 provide for the supply of utilities from the vehicle 11 to the room 9, as managed by the carrier mechanism 1. The line members 7 may include high voltage wiring 15 (FIG. 5) such as AC power cabling or Romex (General Cable Technologies Corp.); low voltage cabling 17 such as telephone cabling, computer network cabling, video cabling, or the like; and various kinds of flexible fluid carrying conduits 19 such as for water, natural gas, propane fuel, or the like. The low voltage cabling 17 is shown enclosed in a flexible protective sheath or conduit 21. It is to be understood that any of the line members 7 could also be enclosed in a flexible protective sheath such as sheath 21.

Referring to FIGS. 3 and 4, the illustrated vehicle 11 includes vehicle framing 24 and a stationary floor 25 to which is connected a guide mechanism 27 for the slide-out room 9. The slide-out room 9 includes a floor 30 and a lower skirt 31 which extends below the floor 30. Rams or drive arms 32 (one of which is shown) are reciprocally mounted to the vehicle framing 24 such as by guide mechanism 27. Outer ends of the drive arms 32 are connected to the lower skirt 31 of the slide-out room 9. The drive arms 32, acting on the lower skirt 31, drive the slide-out room 9 between the retracted configuration (FIG. 3) and extended configuration (FIG. 4) by operation of a drive mechanism (not shown). The structure of the slide-out room 9 and vehicle 11 are generally shown diagrammatically.

Although a slide-out room structure 9 of a trailer-type vehicle 11 is described and illustrated herein, the present invention is not intended to be strictly limited to use in such an environment. It is foreseen that the flexible carrier mechanism 1 would be beneficially applicable to other types of relatively movable structures requiring the management of wiring or tubing therebetween.

Referring again to FIGS. 3 and 4, the carrier strip 3 has an inner end 35 pivotally connected to the stationary structure 11, and an opposite outer end 37 is fixedly secured to movable structure 9. More specifically, and as shown in FIG. 3, a pivot pin 41 is mounted on the stationary floor 25 of the trailer 11 by way of a mounting plate 42 (FIGS. 7 and 8). It should be noted that, for clarity, FIGS. 3 and 7 illustrate the carrier mechanism 1, the stationary structure 11, and the movable structure 9 in an upside down or inverted orientation. Thus, the pivot pin 41 would normally be mounted on a lower surface of the stationary floor 25 and extend downwardly from the mounting plate 42.

The inner end 35 of the carrier strip 3 has a pivot sleeve 45 mounted thereon. The illustrated sleeve 45 is captured by the inner end 35 of the strip 3 being wrapped tightly around the sleeve 45 and attached, as by spot welding, to the remainder of the strip 3. The sleeve 45 is slid over the pin 41 and retained thereon by means such as a retainer collar 46 with a set screw. The sleeve 45 is sized to pivot freely on the pin 41. The outer end 37 of the carrier strip 3 is provided with apertures 48 (FIG. 7) to receive fasteners to thereby enable securing the outer end 37 to the lower skirt 31 of the slide-out room 9. A rectangular mounting plate 49 may be used to reinforce the carrier strip end 37.

The illustrated carrier strip 3 is a thin, relatively wide, elongated strip or web and is formed of a material which is both flexible and resilient, that is, which has a shape retaining property. Such a material could include a galvanized steel strip, spring steel or a plastic material such as a fiber reinforced plastic. Another such material foreseen for the support strip 3 is a product manufactured by Kencove Farm Fence, Inc. and sold as horse fencing. The material is formed by two strands of high tensile strength 12½ gauge steel wire molded into a 4 to 4.25 inch wide plastic web, near the outer edges thereof. A desired property of the strip 3 is that it be resistant to sag within its own plane, while being easily flexible in a direction normal to its plane. In other words, the strip 3 holds the line members 7 at a generally constant level or grade beneath the floor 25 to prevent the line members 7 from sagging when the slide-out room 9 is retracted.

Referring particularly to FIGS. 5 and 6, the illustrated line retainers 5 are rectangular retainer plates, each having a slot or slit 52 and a plurality of line member receiving apertures 54 formed therethrough. The slot 52 is sized to enable the carrier strip 3 to pass therethrough whereby the retainers 5 may be positioned at selected intervals along the strip 3. The retainers 5 may be secured in desired places along the strip 3, as by crimps 56 (FIG. 6) formed in the edges of the strip on opposite sides of each plate. It is foreseen that the crimps 56 could be formed before or after the retainers 5 are threaded onto the carrier strip 3. The line receiving apertures 54 are aligned and positioned a desired distance from the slot 52. The apertures 54 are also spaced from one another a desired distance to separate and isolate the various line members 7 from one another. The spacing is selected to meet the requirements of adopted codes or regulations dictating the minimum spacing between adjacent electrical wires, which for example may have to be spaced an inch or more apart on centers.

The carrier mechanism 1 is installed before connecting the line members 7 to the fixtures or appliances in the slide-out room 9 with which they are to be associated. As an initial step a desired number of retainers (five of which are shown in FIGS. 3 and 4) are threaded onto the carrier strip 3. Th retainers 5 are threaded onto the carrier strip 3, so that the line receiving apertures 54 extend inward from the surface of the carrier strip 3 which will form the inner curved surface of the mechanism when installed. In addition, as a preliminary step, the pivot pin 41 is mounted in a desired location to the underside of the stationary floor 25 of the vehicle 11 by driving screws through the preformed holes in the mounting plate 42. Line members 7 are then threaded through aligned line receiving apertures 54 in the retainers 5.

The pivot sleeve 45 retained in the inner end 35 of the carrier strip 3 is slid onto the pivot pin 41 and secured in place with the retaining collar 46. The outer end 37 of the carrier strip 3 is then fastened to the lower skirt 31 of the slide-out room 9 using screws or other suitable fasteners driven through the apertures 48 formed therein. Although the outer end 37 of the carrier strip 3 is shown as positioned on the skirt 31 in axial alignment with the inner end 35 of the carrier strip (relative to the direction of travel of the room 9 relative to the vehicle 11), the outer end 37 can be offset relative to the first end either horizontally or vertically. For example, referring to FIGS. 3 and 4, it may be preferable to mount the outer end 37 of the strip 3 on the skirt, offset to the left more than is shown, such that the portion of the strip 3 extending just to the right of the mounting plate 49 is aligned with the pivot pin 41. This alignment maximizes the length of extension of the slide-out room 9 per a given length of strip 3. It is also foreseen that when the carrier mechanism 1 is used to support drain line, the outer end 37 can be mounted slightly higher than the inner end 35, relative to the ground, to allow fluids in the drain line to drain properly.

The ends of the line members 7 extending past the outer end 37 of the carrier strip 3 are directed into the slide-out room 9 through one or more openings (not shown) extending through the floor 30.

Figure 9:
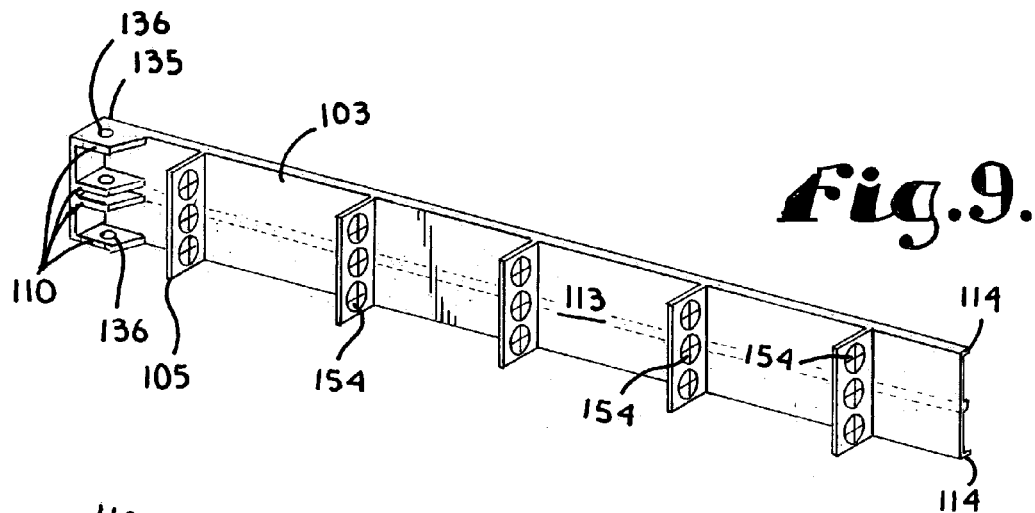
FIG. 9 is a front-perspective view of an alternative embodiment of a carrier mechanism of the present invention.
Figure 10:
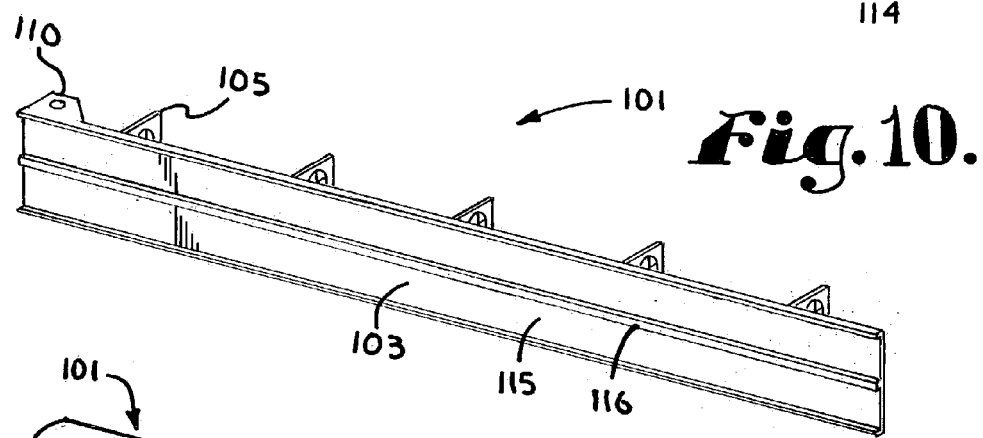
FIG. 10 is a rear perspective view of the alternative embodiment shown in FIG. 9.
Figure 11:
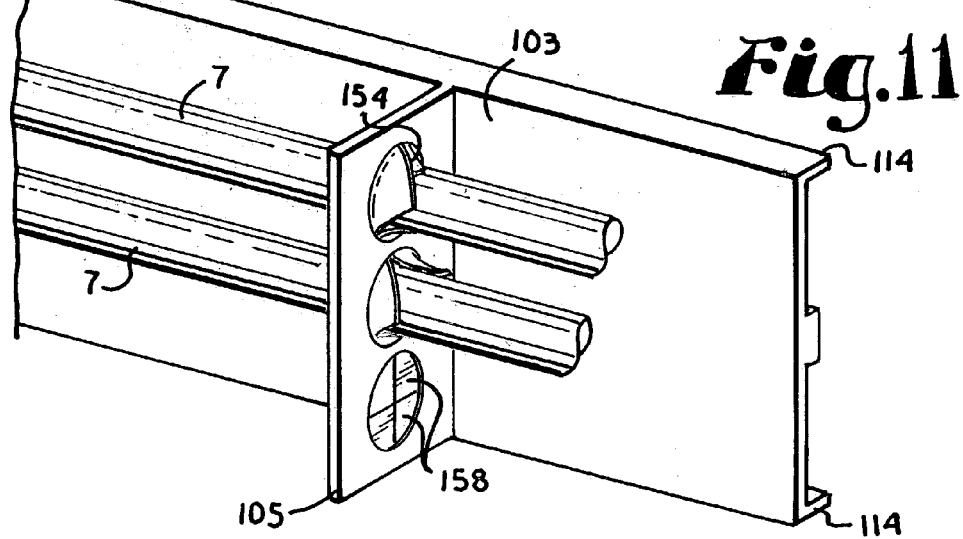
FIG. 11 is an enlarged and fragmentary perspective view showing a wire threaded through a hole in a retainer of the alternative embodiment of the carrier mechansim as shown in FIG. 9.

An alternative embodiment 101 of the carrier mechanism 1 is shown in FIGS. 9–11. The carrier mechanism 101 includes a carrier strip 103, retainers 105 and hinge members or gussets 110 which are integrally formed as a single molded part which may be formed from a plastic with a flexible filler such as fiberglass reinforced polypropylene. The hinge members 110 and retainers 105 are formed on a first or inner surface 113 of the carrier strip 103 and reinforcing flanges 114 are formed along the upper and lower edges of the carrier strip 103 and extend outward from a second our outer surface 115 of the carrier strip 103. A third or central reinforcing flange 116 is formed on the outer surface 115 centrally between the upper and lower reinforcing flanges 114.

The hinge members or gussets 110 are formed on an inner end 135 of the carrier strip 103 on the inner surface 113 and include aligned apertures 136 extending therethrough to receive a pivot pin 41 for mounting of the carrier strip 103 on the pivot pin 41. The embodiment shown includes four gussets 110, one each along the top and bottom edge of strip 103 and two middle gussets 110 positioned in relatively closely spaced apart relation from each other generally medially between the upper and lower edges of strip 103. The middle gussets 110 are positioned in alignment with the middle reinforcing flange 116 on the opposite surface thereof.

The retainers 105 each include a plurality (three shown) of aligned line receiving apertures 154 formed therein and through which line members 7 may the threaded (two of which are shown in FIG. 11). A plurality of line member engaging fingers 158 extend across the line receiving apertures 154. The fingers 158 are formed from a layer of the material forming the retainer 105 but of reduced thickness and with radially extending score lines formed therein to form the edges of the fingers 158. The fingers 158 engage the outer surface of the line member 7 inserted through the associated line receiving aperture 154.

The carrier mechanism 101 is adapted to be cut in half, to provide a carrier adapted to support fewer line members 7. To do so, the strip 103 is cut down the middle of the central reinforcing flange 116. The space between the middle gussets allows a cutting blade to pass between the two. The resulting half-strips formed from carrier mechanism 101, each include upper and lower reinforcing flanges, two gussets 110 and retainers having a single, whole, line receiving aperture 154 for supporting a single line member 7.

As suggested above, the retainers 105 could include more than three line receiving apertures 154, and in the case of a carrier mechanism with four line receiving apertures 154, the resulting half-strips might each include two line receiving apertures 154. It is also foreseen, that the middle reinforcing flange 116 and the middle gussets 110 could be positioned in alignment between one of the outer aligned sets of apertures 154 and the central aligned sets of apertures 154, so that when split, one of the resulting strips includes one aperture 154, per retainer, and the other strip includes two apertures 154 per retainer. It is also foreseen that a reinforcing flange, like the middle reinforcing flange 116, and closely spaced gussets 110 could be positioned between each of the adjacent line receiving apertures 154 on each retainer 105 to provide a carrier mechanism 101 that could be split into separate strips for each set of aligned line receiving apertures 154 (i.e. three strips for retainers originally having three apertures 154). Other variations and combinations of apertures 154, flanges 116 and gussets 110 on each carrier mechanism 101 could be utilized as well.

It is to be understood that the carrier strips 3 or 103 are only supported at their ends and are not supported therebetween. In a preferred embodiment, the material forming the carrier strip 3 or 103, is selected to have sufficient vertical stiffness (resistance to sagging) to support not only the weight of the line members 7 supported thereby, but also dirt, water and particularly ice which may accumulate on the carrier during certain travel conditions.

In addition to supporting the line members 7, the carrier strips 3 and 103 function to protect the line members 7 from wear on the skirt 31 or any frame members, such as frame member 24 against which the strips 3 and 103 may abut when the slide-out room 9 is fully retracted. Since the line members 7 are supported on the inner curved surface of the carrier strips 3 or 103, as shown in FIG. 3 for strip 3, the outer surface of the strips provide a buffer or barrier to surfaces against which the line members 7 might otherwise contact.

It is to be understood that while certain forms of the present invention have been illustrated and described herein, it is not to be limited to the specific forms or arrangement of parts described and shown. For example, although the carrier strip 3 is shown as being pivotally connected at only one end; it is foreseeable, the either or both ends of the carrier strip 3 could be pivotally mounted as is generally shown in FIG. 12. As shown in FIG. 12, both the inner end 35 and the outer end 37 of the carrier strip 3 are pivotally mounted on pivot pins 41 and 181 respectively. Pivot pin 41 is mounted to the stationary structure or trailer 11 and the pivot pin 181 is mounted to the movable structure or slide-out room 9. A cutout or notch 183 may be formed in the stationary floor 25 of the trailer 11 to receive the pivot pin 181 when the slide-out room 9 is fully retracted.

As shown in FIG. 12, the inner end 35 of the carrier strip 3 can be connected to other structure associated with the slide-out room 9, other than the skirt 31. As another example, the inner end 35 could be connected to an L-shaped plate having a vertical leg abutting against the skirt and a horizontal leg bolted to the floor of the slide-out room 9. The horizontal leg could be mounted to a bar extending between parallel extending rams used to slide the room 9 between the extended and retracted positions, or the inner end 35 could be pivotally mounted on a pivot pin attached to and extending below such a bar. It is foreseen that other variations within the scope of the claims could be incorporated into such a line member carrier.

What is claimed and desired to secure by Letters Patent is:
1. A line carrier for supporting a line member extending between a relatively stationary structure and a relatively movable structure which is movable through a limited range relative to said relatively stationary structure, said line carrier comprising:
   (a) an elongated strip of a flexible material, said elongated strip having opposite ends;
   (b) a first end of said strip being connected to a first structure of said relatively stationary structure and said relatively movable structure;

(c) a second end of said strip being pivotally connected to a second structure of said relatively stationary structure and said relatively movable structure; and (d) at least one retainer feature connecting said line member relative to said strip at a location along said strip between said first and second ends thereof, wherein:

(e) said relatively movable structure is translatable relative to said relatively stationary structure in a direction of travel; and (f) said first end of said strip is positioned in substantial alignment with said second end along a line substantially parallel to said direction of travel.

2. The line carrier as set forth in claim 1 further including:
(a) a fastener receiving aperture formed through said strip at said first end; and
(b) a fastener being received through said aperture to secure said first end of said strip to said first structure.

3. The carrier as set forth in claim 1 further including:
(a) a cylindrical pivot sleeve secured to said second end of said elongate strip;
(b) a pivot pin secured to said second structure; and
(c) said sleeve being received over said pivot pin to pivotally connect said second end of said strip to said second structure.

4. The carrier as set forth in claim 1 further including:
(a) a plurality of retainer features spaced along said strip for connecting line member relative to said strip.

5. The carrier as set forth in claim 1 wherein said retainer feature includes:
(a) a retainer plate having at least one line receiving aperture formed therethrough and sized and shaped to enable a line member to extend therethrough.

6. The carrier' as set forth in claim 5 wherein:
(a) said retainer plate includes a strip receiving slot formed therethrough; and
(b) said retainer plate having said strip received through said slot and being selectively positioned along said strip.

7. The carrier as set forth in claim 1 wherein:
(a) said strip is formed of an elongated strip of a flexible spring metal.

8. A line carrier for supporting a line member extending between a relatively stationary structure and a relatively movable structure which is movable through a limited range relative to said relatively stationary structure, said line carrier comprising:
(a) an elongated strip of a flexible material, said elongated strip having opposite ends;
(b) a first end of said strip being connected to a first structure of said relatively stationary structure and said relatively movable structure;
(c) a second end of said strip being pivotally connected to a second structure of said relatively stationary structure and said relatively movable structure; and
(d) at least one retainer feature connecting said line member relative to said strip at a location along said strip between said first and second ends thereof, wherein:
(e) said first end of said strip is secured to said relatively movable structure; and
(f) said second end is pivotally connected to said relatively stationary structure.

9. A carrier as set forth in claim 1 wherein:
said first end and said second end remain in said substantial alignment throughout translation of said movable structure relative to said stationary structure.

10. A wiring and tubing carrier for supporting a combination of wires and/or tubes extending between a relatively stationary structure and a relatively movable structure which is translatable through a limited range relative to said stationary structure between a retracted condition and an extended condition, said carrier comprising:
(a) an elongated carrier strip of a flexible material, said strip having opposite ends and extending arcuately between said opposite ends;
(b) a first end of said strip being secured to said stationary structure;
(c) a second end of said strip being pivotally connected to said stationary structure; and
(d) a plurality of retainer members connecting said wires and/or tubes to said strip at a plurality of locations spaced along said strip between said opposite ends thereof in such a manner that said wires and/or tubes follow said strip during movement of said movable structure.

11. A carrier as set forth in claim 10 and including:
(a) a fastener receiving aperture formed through said strip at said first end; and
(b) a fastener being received through said aperture to secure said first end of said strip to said first structure.

12. A carrier as set forth in claim 10 and including:
(a) said second end of said strip having a cylindrical pivot sleeve secured thereto;
(b) a pivot pin being secured to said second structure; and
(c) said sleeve being received over said pivot pin to thereby pivotally connect said second end of said strip to said second structure.

13. A carrier as set forth in claim 10 and including:
(a) a fastener receiving aperture formed through said strip at said first end;
(b) a fastener being received through said aperture to secure said first end of said strip to said first structure;
(c) said second end of said strip having a cylindrical pivot sleeve secured thereto;
(d) a pivot pin being secured to said second structure; and
(e) said sleeve being received over said pivot pin to thereby pivotally connect said second end of said strip to said second structure.

14. A carrier as set forth in claim 10 wherein said plurality of retainer members includes:
(a) a plurality of retainer plates, each plate having at least one line receiving aperture formed therethrough which is sized and shaped to enable a wire or tube to extend therethrough;
(b) each retainer plate including a strip receiving slot formed therethrough;
(c) each retainer plate having said strip extending through its associated slot; and
(d) said retainer plates being positioned in selectively spaced relation along said strip.

15. A carrier as set forth in claim 10 wherein:
(a) said strip is formed of an elongated strip of a flexible spring metal.

16. A carrier as set forth in claim 10 wherein:
(a) said movable structure is translatable relative to said stationary structure in a direction of travel;
(b) said first end of said strip is positioned in substantial alignment with said second end along a line substantially parallel to said direction of travel; and
(c) said first end and said second end remain in said substantial alignment throughout translation of said movable structure relative to said stationary structure.

17. A wiring and tubing carrier supporting a combination of wires and/or tubes extending between a relatively stationary vehicle structure and a slide-out room structure which is translatable through a limited range relative to said vehicle structure between a retracted condition and an extended condition, said carrier comprising:
- (a) an elongated carrier strip of a flexible material, said strip having opposite ends and extending arcuately between said opposite ends;
- (b) a first end of said strip being secured to said vehicle structure;
- (c) a second end of said strip having a cylindrical pivot sleeve secured thereto and said sleeve being received over a pivot pin secured to said vehicle structure to thereby pivotally connect said second end of said strip to said vehicle structure;
- (d) a plurality of retainer features positioned along said strip and engaging said wires and/or tubes with said strip at a plurality of locations spaced along said strip between said opposite ends thereof in such a manner that said wires and/or
tubes follow said strip during movement of said room structure;
- (e) said room structure being translatable relative to said vehicle structure in a direction of travel;
- (f) said first end of said strip positioned in substantial alignment with said second end along a line substantially parallel to said direction of travel; and
- (g) said first end and said second end remaining in said substantial alignment throughout translation of said room structure relative to said vehicle structure.

18. A carrier as set forth in claim 17 and including:
- (a) a fastener receiving aperture formed through said strip at said first end; and
- (b) a fastener being received through said aperture to secure said first end of said strip to said vehicle structure.

19. A carrier as set forth in claim 17 wherein said plurality of retainer features includes:
- (a) a plurality of retainer plates, each plate having a plurality of receiving apertures formed therethrough which are sized and shaped to enable a wire or tube to extend therethrough;
- (b) each retainer plate including a strip receiving slot formed therethrough;
- (c) each retainer plate having said strip extending through its associated slot; and
- (d) said retainer plates being positioned in selectively spaced relation along said strip and being urged to retain in position by frictional engagement between said retainer plates and said strip.

20. A carrier as set forth in claim 17 wherein:
- (a) said strip is formed of an elongated strip of a flexible spring metal.

21. A line carrier for supporting a line member extending between a vehicle and a slide-out room which is slidably advanceable between a retracted position and an extended position through a hole in a wall of said vehicle; said vehicle having a vehicle floor; said slide-out room having a slide-out room floor; said line carrier comprising:
- (a) an elongated strip of a flexible material;
- (b) a first end of said strip being connected to said slide-out room;
- (c) a second end of said strip being connected to said vehicle below said vehicle floor;
- (d) at least one of said first and second ends of said strip being pivotally connected to said slide-out room or said vehicle respectively; and
- (e) at least one retainer feature connecting said line member relative to said elongated strip at a location along said strip between said first and second ends thereof, wherein:
- (f) said movable structure is translatable relative to said stationary structure in a direction of travel; and
- (g) said first end of said strip is positioned in substantial alignment with said second end along a line substantially parallel to said direction of travel.

* * * * *